(12) United States Patent
Worden et al.

(10) Patent No.: US 6,473,299 B1
(45) Date of Patent: Oct. 29, 2002

(54) ANTI-VIBRATION DISK DRIVE CAGE

(75) Inventors: Curtis W. Worden, Decatur; Michael Enright, Owens Cross Roads, both of AL (US)

(73) Assignee: Intergraph Corporation, Huntsville, AL (US)

( * ) Notice: Subject to any disclaimer, the term of this patent is extended or adjusted under 35 U.S.C. 154(b) by 0 days.

(21) Appl. No.: 09/661,654

(22) Filed: Sep. 14, 2000

Related U.S. Application Data

(60) Provisional application No. 60/154,525, filed on Sep. 16, 1999.

(51) Int. Cl.[7] ................................................ G06F 1/16
(52) U.S. Cl. ..................... 361/685; 361/754; 361/801; 312/223.2; 439/928.1
(58) Field of Search ................. 361/685, 683, 361/684, 686, 724–727, 732, 740, 754–755, 759, 798, 801; 312/223.2, 331, 334.23; 439/928.1

(56) References Cited

U.S. PATENT DOCUMENTS

| 5,726,864 | A | * | 3/1998 | Copeland et al. ........... 361/800 |
| 5,914,855 | A | | 6/1999 | Gustafson et al. .......... 361/685 |
| 5,995,364 | A | | 11/1999 | McAnally et al. .......... 361/685 |
| 6,002,658 | A | | 12/1999 | Aso et al. ................. 369/75.1 |
| 6,293,636 | B1 | * | 9/2001 | Le et al. ................... 312/223.1 |

* cited by examiner

Primary Examiner—Darren Schuberg
Assistant Examiner—Hung Van Duong
(74) Attorney, Agent, or Firm—Bromberg & Sunstein LLP

(57) ABSTRACT

A disk system includes a disk cage having a spring and an interior wall that forms a disk drive chamber. The disk system also includes a disk drive removably coupled within the disk drive chamber. The spring in the disk cage preferably is coupled with the interior wall and extends into the disk drive chamber to form a receiving chamber. The spring contacts the disk drive to dampen disk drive vibration.

11 Claims, 2 Drawing Sheets

ANTI-VIBRATION DISK DRIVE CAGE

PRIORITY

This application claims priority from copending U.S. provisional patent application Ser. No. 60/154,525, filed Sep. 16, 1999, and entitled, "Anti-Vibration Disk Drive Cage," the disclosure of which is incorporated herein, in its entirety, by reference.

FIELD OF THE INVENTION

The invention generally relates to disk drives in computer systems and, more particularly, the invention relates to reducing vibration produced by a rotating disk drive in a computer system.

BACKGROUND OF THE INVENTION

Disk drives commonly are mounted within a rigid disk cage that is a part of a computer system. To increase data storage capacity, the disk cage often includes several bays for receiving more than one disk drive. For example, well known RAID (redundant array of inexpensive disk) arrays have a plurality of removable disk drives that each are removably coupled within specific bays of a single disk cage. Each disk drive in a RAID array generally includes an interface that couples with a corresponding interface to a main bus on the computer system. The disk drives in many well known RAID arrays are considered to be "hot swappable" since they may be removed from and reinserted into the cage at any time.

As the processing speed of computer systems increase, there is a growing need to more rapidly access data on RAID arrays. To that end, disk drives are being developed to rotate at ever higher speeds (e.g., 10,000 revolutions per minute). Although beneficial for rapidly retrieving data, operating the disk drives at such high speeds often produces undesired vibrations that can cause the vibrating disk drive (as well as other disk drives in the RAID array) to malfunction.

This vibration is multiplied when each disk drive in a RAID array is vibrating. In fact, the disk drives can vibrate at a resonant frequency that could cause a catastrophic data failure of the entire RAID array.

SUMMARY OF THE INVENTION

In accordance with one aspect of the invention, a disk cage for use with a computer system includes an interior wall that forms a disk drive chamber, and a spring for reducing the vibration of any disk drives that may be inserted within the disk chamber. The spring is coupled with the interior wall and extends into the disk drive chamber to form a receiving chamber for receiving the disk drive.

In preferred embodiments, the drive chamber is substantially rectangular. The spring may be any well known type of spring, such as a leaf spring.

In accordance with another aspect of the invention, a disk system includes a disk cage having a spring and an interior wall that forms a disk drive chamber. The disk system also includes a disk drive removably coupled within the disk drive chamber. The spring in the disk cage preferably is coupled with the interior wall and extends into the disk drive chamber to form a receiving chamber. The spring contacts the disk drive to dampen disk drive vibration.

In some embodiments, the spring is permanently secured to the interior wall. In other embodiments, the disk cage includes a plurality of additional springs coupled with the interior wall. The disk system further includes a plurality of disk drives removably coupled within the receiving chamber. Each disk drive contacts one spring to dampen disk drive vibration.

BRIEF DESCRIPTION OF THE DRAWINGS

The foregoing and advantages of various aspects of the invention will be appreciated more fully from the following further description thereof with reference to the accompanying drawings, wherein.

DESCRIPTION OF PREFERRED EMBODIMENTS

Figure 1:
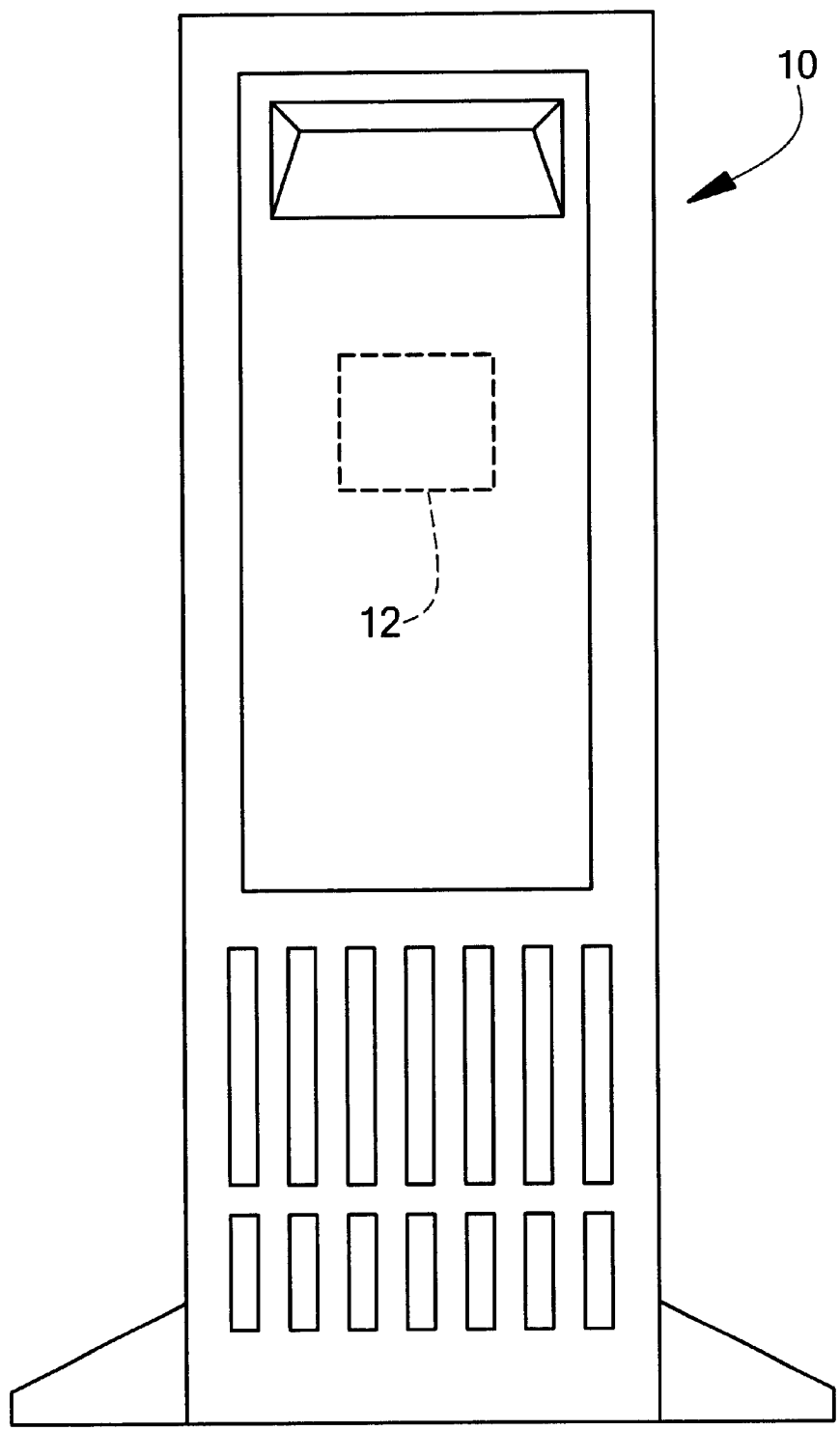
FIG. 1 schematically shows a computer tower that may be utilized with preferred embodiments of the invention.

FIG. 1 schematically shows a computer tower 10 having a disk cage (FIG. 2) configured in accordance with preferred embodiments of the invention. The computer tower 10 may be used with a computer system for storing and processing data. In such case, the computer tower 10 may have many computer elements commonly known in the art, such as a microprocessor, random access memory, busses, and other similar elements. It should be noted, however, that although a computer tower 10 is shown, other types of computer systems may be used.

In preferred embodiments, the computer tower 10 is a redundant array of inexpensive disks (referred to herein as a "RAID array") that is utilized to store large quantities of data. The RAID array may be any RAID array known in the art, such as a model number FC5500 Clariion RAID array, available from EMC Corporation of Hopkinton, Mass. Such RAID array implements at least one RAID level and thus, includes a plurality of disk drives for storing a large quantity of data.

Figure 2:
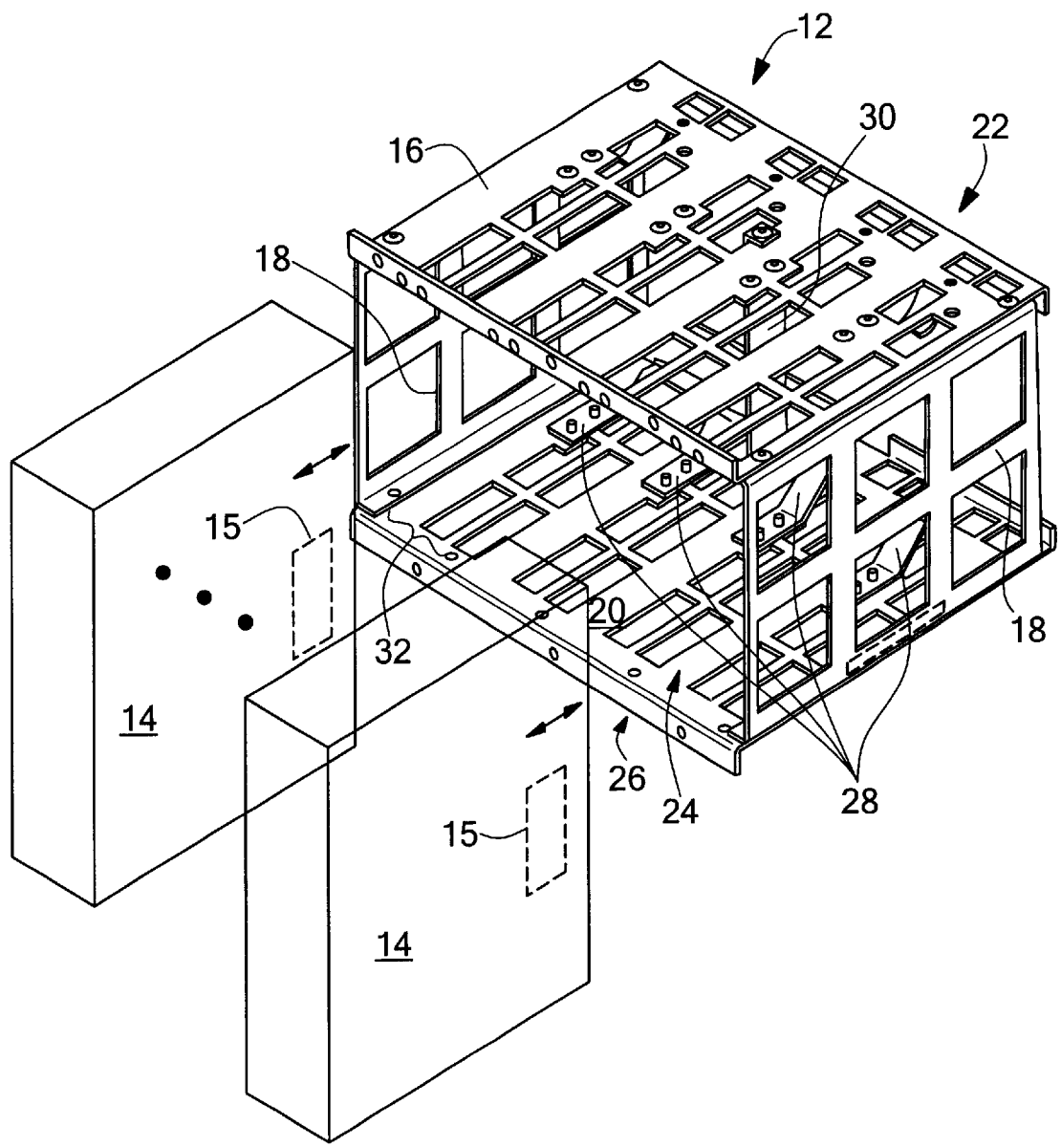
FIG. 2 schematically shows a disk cage that is configured to receive a plurality of disk drives in accordance with preferred embodiments.

FIG. 2 schematically shows a disk cage 12 configured in accordance with preferred embodiments of the invention. More particularly, in illustrative embodiments, the disk cage 12 is configured to receive four disk drives 14 within a disk chamber 24. The drives 14 are hot swappable and thus, each include an interface 15 for electrically coupling with a backplane (not shown) at a rear portion of the disk cage 12. The disk cage 12 includes a top wall 16, two side walls 18, a bottom wall 20, and a rear wall 22 that together form the disk chamber 24. The disk chamber 24 also includes a front opening 26 for receiving the disk drives 14.

Four leaf springs 28 preferably are secured (e.g., riveted) to the bottom wall 20 and extend upwardly into the disk chamber 24. Each leaf spring 28 preferably is utilized to secure one of the disk drives 14 within the disk cage 12. Accordingly, each leaf spring 28 forms a separate receiving chamber 32 for receiving one disk drive 14. In alternative embodiments, other types of springs 28 may be used.

In other embodiments, each receiving chamber 32 includes two corresponding springs 28. In particular, in addition to the spring 28 secured to the bottom wall 20, each receiving chamber 32 includes a second spring 28 that is coupled to the top wall 16 within its respective chamber. Use of two (or more) springs 28 further dampens undesired vibration.

The leaf springs 28 are considered to be "permanently" secured to the bottom wall 20 since they are not removable with a minimal amount of force. For example, removing rivets or cutting the springs 28 would remove the springs 28, but such removal methods are not considered to require a minimal amount of force (i.e., they change the permanent structure of the entire disk cage 12). In contrast, as discussed herein, the disk drives 14 are removably coupled within the disk cage 12 since they can be removed manually with a minimal amount of force. In illustrative embodiments, the springs 28 are manufactured from 302 stainless steel full hard having the thickness of about 0.25 millimeters. The spring may have a spring constant of about 30 to 40 pounds per inch.

To ensure rigidity, the disk cage 12 preferably is manufactured from cold rolled steel having a thickness of about 0.060 inches. In addition, the disk cage 12 also may include a tension member 30 extending between the top wall 16 to the bottom wall 20. The disk cage 12 shown in FIG. 2 has a height (i.e., between the top wall 16 and bottom wall 20) of about 4.5 inches, a width (i.e., between the side walls 18) of about 6.0 inches, and a depth (i.e., between the front opening 26 and the rear wall 22) of about 6.0 inches. Of course, it should be noted that in a manner similar to other specifics discussed herein, these dimensions are exemplary and not intended to limit the scope of various embodiments of the invention.

Each disk drive 14 shown in FIG. 2 has a height of about 4.0 inches, a width of about 1.0 inches, and a depth of about 6.0 inches. Although not shown, movable clips may be utilized to removably secure the disk drives 14 within their respective locations in the disk cage 12. Accordingly, when inserted into the disk cage 12, each disk drive 14 is forced upwardly by its corresponding spring 28. Guides (not shown) within the disk cage 12 may be utilized to guide each inserted disk drive 14 within the disk cage 12 so that it couples with the backplane. The springs 28 are selected so that vibration is minimized to a reasonable tolerance that does not significantly adversely affect the disk drives 14.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

Having thus described the invention, what we desire to claim and secure by Letters Patent is:

1. A disk drive cage comprising:

an interior wall forming a disk drive chamber; and a spring coupled with the interior wall and extending into the disk drive chamber, the spring and disk drive chamber forming a receiving chamber for receiving a disk drive, wherein the spring is a leaf spring.

2. The disk drive cage as defined by claim 1 wherein the disk drive chamber is formed in a substantially rectangular shape.

3. The disk drive cage as defined by claim 1 wherein the spring is permanently secured to the interior wall.

4. A disk system comprising:

a disk cage having an interior wall that forms a disk drive chamber, the disk cage also having a spring coupled with the interior wall and extending into the disk drive chamber, the spring and disk drive chamber forming a receiving chamber; and a disk drive removably coupled within the receiving chamber, the spring contacting the disk drive to dampen disk drive vibration, wherein the spring is a leaf spring.

5. The disk system as defined by claim 4 herein the disk drive chamber is formed in a substantially rectangular shape.

6. The disk system as defined by claim 4 wherein the spring is permanently secured to the interior wall.

7. The disk system as defined by claim 7 wherein the disk cage includes a plurality of springs coupled with the interior wall, the disk system further comprising a plurality of disk drives removably coupled within the receiving chamber, each disk drive contacting one spring to dampen disk drive vibration.

8. A disk system comprising:

a disk cage having an interior wall that forms a disk drive chamber, the disk cage also having a spring coupled with the interior wall and extending into the disk drive chamber, the spring and disk drive chamber forming a receiving chamber; and a disk drive removably coupled within the receiving chamber, the spring contacting the disk drive to dampen disk drive vibration, wherein the disk cage includes a plurality of springs coupled with the interior wall, the disk system further comprising:

a plurality of disk drives removably coupled within the receiving chamber, each disk drive contacting one spring to dampen disk drive vibration.

9. The disk system as defined by claim 8 wherein the disk drive chamber is formed in a substantially rectangular shape.

10. The disk system as defined by claim 8 wherein the spring is a leaf spring.

11. The disk system as defined by claim 8 wherein the spring is permanently secured to the interior wall.

* * * * *

UNITED STATES PATENT AND TRADEMARK OFFICE
CERTIFICATE OF CORRECTION

PATENT NO. : 6,473,299 B1
DATED : October 29, 2002
INVENTOR(S) : Curtis W. Worden, Jr. et al.

It is certified that error appears in the above-identified patent and that said Letters Patent is hereby corrected as shown below:

Column 4,
Line 18, replace "herein" with -- wherein --.

Signed and Sealed this

Eleventh Day of February, 2003

JAMES E. ROGAN
*Director of the United States Patent and Trademark Office*